(12) United States Patent
Moen et al.

(10) Patent No.: US 12,126,631 B2
(45) Date of Patent: Oct. 22, 2024

(54) DETECTING COMPROMISED CREDENTIALS IN A CREDENTIAL STUFFING ATTACK

(71) Applicant: Shape Security, Inc., Santa Clara, CA (US)

(72) Inventors: Daniel G. Moen, Sunnyvale, CA (US); Carl Schroeder, Mountain View, CA (US)

(73) Assignee: SHAPE SECURITY, INC., Seattle, WA (US)

(*) Notice: Subject to any disclaimer, the term of this patent is extended or adjusted under 35 U.S.C. 154(b) by 183 days.

(21) Appl. No.: 17/232,999

(22) Filed: Apr. 16, 2021

(65) Prior Publication Data

US 2021/0258330 A1 Aug. 19, 2021

Related U.S. Application Data

(63) Continuation of application No. 16/024,691, filed on Jun. 29, 2018, now Pat. No. 11,044,261.

(60) Provisional application No. 62/528,035, filed on Jul. 1, 2017.

(51) Int. Cl.
| | | |
|---|---|---|
| *H04L 9/40* | (2022.01) | |
| *G06N 20/00* | (2019.01) | |
| *H04L 67/01* | (2022.01) | |
| *H04L 67/02* | (2022.01) | |

(52) U.S. Cl.
CPC ...... *H04L 63/1416* (2013.01); *H04L 63/1425* (2013.01); *H04L 67/01* (2022.05); *H04L 67/02* (2013.01); *G06N 20/00* (2019.01); *H04L 63/083* (2013.01)

(58) Field of Classification Search
CPC .......... G06F 21/00; G06F 21/55; G06F 21/31; H04L 63/20; H04L 63/083
See application file for complete search history.

(56) References Cited

U.S. PATENT DOCUMENTS

| | | | |
|---|---|---|---|
| 9,092,782 B1* | 7/2015 | Zaslavsky | G06Q 20/4016 |
| 10,375,095 B1* | 8/2019 | Turcotte | H04L 63/1425 |
| 2016/0088000 A1* | 3/2016 | Siva Kumar | H04L 63/1416 726/23 |
| 2016/0197907 A1* | 7/2016 | Bajenov | H04L 63/083 726/7 |
| 2018/0309721 A1* | 10/2018 | Ashley | H04L 63/06 |
| 2018/0332079 A1* | 11/2018 | Ashley | H04L 63/20 |
| 2020/0244470 A1* | 7/2020 | Ruckriemen | H04L 9/3236 |

* cited by examiner

*Primary Examiner* — Benjamin E Lanier
*Assistant Examiner* — Shu Chun Gao
(74) *Attorney, Agent, or Firm* — Troutman Pepper Hamilton Sanders LLP

(57) ABSTRACT

Techniques are provided for detecting compromised credentials in a credential stuffing attack. A set model is trained based on a first set of spilled credentials. The set model does not comprise any credential of the first set of spilled credentials. A first request is received from a client computer with a first candidate credential to login to a server computer. The first candidate credential is tested for membership in the first set of spilled credentials using the set model. In response to determining the first set of spilled credentials includes the first candidate credential using the set model, one or more negative actions is performed.

16 Claims, 3 Drawing Sheets

DETECTING COMPROMISED CREDENTIALS IN A CREDENTIAL STUFFING ATTACK

This is a continuation application of U.S. patent application Ser. No. 16/024,691 filed Jun. 29, 2018 (now U.S. Patent Application Publication No. 2019/0007428) which claims the benefit of U.S. Provisional Patent Application Ser. No. 62/528,035, filed Jul. 1, 2017, which are hereby incorporated by reference in their entirety.

FIELD

This technology relates to methods and systems that detect compromised credentials in a credential stuffing attack.

BACKGROUND

A credential is an object associated with an account that is used to identify or authenticate the bearer as the owner or user of the account. A credential may comprise one or more of the following: username, password, certificate, identifier, or one or more other values that are associated with an account. For example, a credential may comprise a username and password associated with a bank account.

A spilled credential is a credential that is acquired by an attacker or other unauthorized party. A spilled credential may be published, or made available to the public. For example, a set of spilled credentials may be a published database of usernames and passwords for a particular website.

Attackers collect spilled credentials to gain unauthorized access to accounts. For example, an attacker may gain unauthorized access to an account on a website by logging in to the website using a spilled username and password associated with the account.

Unfortunately, users sometimes reuse credentials for multiple accounts. For example, a user can use the same username and password for a bank account, email account, and a social media account. Accordingly, if an attacker finds a spilled credential for an account on a particular domain or website, then the attacker can use the spilled credential to access other accounts on other websites. Using spilled credentials to attempt to access accounts on one or more other websites is called a credential stuffing attack.

Administrators for the other websites may be unable, or unwilling, to deal with the technical challenges and security risks of determining whether any spilled credentials are credentials associated with any accounts in the other websites. Furthermore, attackers may implement a credential stuffing attack using credentials that are not known to be spilled.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The appended claims may serve as a summary of the invention.

BRIEF DESCRIPTION OF THE DRAWINGS

In the drawings:

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments. For example, attack detection computer 110 and/or one or more components or modules of attack detection computer 110 in FIG. 1 may be described with reference to several components illustrated in FIG. 2 and discussed in detail below, but using the particular arrangement illustrated in FIG. 1 or FIG. 2 is not required in other embodiments. Furthermore, while the instructions discussed in many example embodiments are HyperText Markup Language ("HTML") and JavaScript instructions, in other embodiments, the instructions received and generated may be any other standard or proprietary instructions configured to be executed by a client computer.

DETAILED DESCRIPTION

Figure 1:
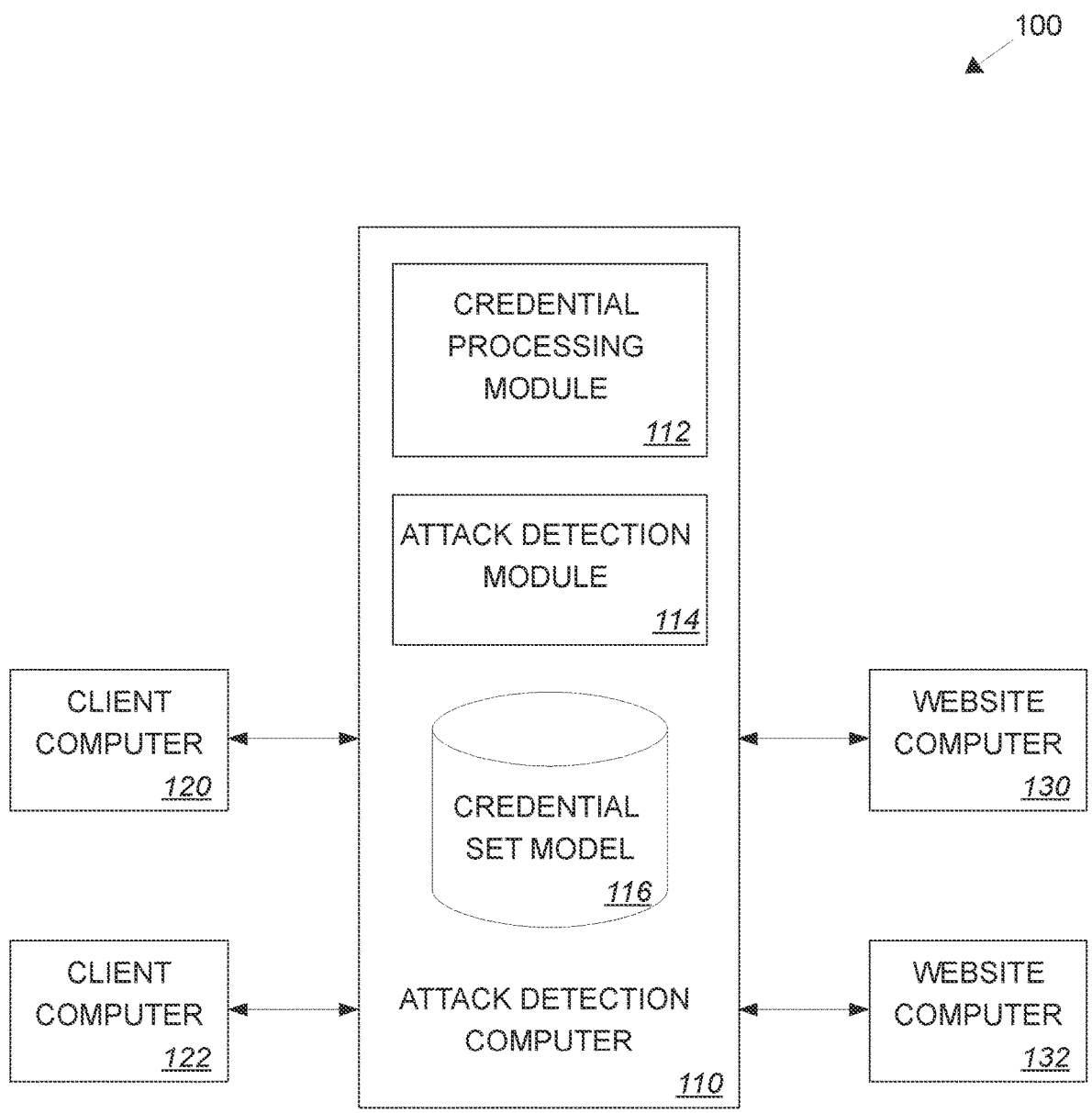
FIG. 1 illustrates a computer system for detecting spilled credentials in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Words, such as "or", may be inclusive or exclusive unless expressly stated otherwise; a "set" may comprise zero, one, or two or more elements. For example, a set of instructions may comprise one or more instructions. One or more of a first set of objects or a second set of objects may be one or more of the first set of objects or one or more of the second set of objects.

A "computer" may be one or more physical computers, virtual computers, or computing devices. As an example, a computer may be, or comprise, one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" herein may mean one or more computers, unless expressly stated otherwise.

A "module" may be software and/or hardware stored in, or coupled to, a memory and/or one or more processors on one or more computers. Additionally or alternatively, a module may comprise specialized circuitry. For example, a module, such as credential processing module 112 credential set model 114, or attack detection module 116, in FIG. 1 and discussed further herein, may be hardwired or persistently programmed to support a set of instructions to, and/or that are useful to, perform the functions discussed herein, such as the following: receiving requests from one or more client computers, determining whether one or more requests are part of an attack, determining if the attack includes one or more spilled credentials, learning the one or more spilled credentials, forwarding requests to one or more websites, or notifying a website that one or more credentials have been spilled as discussed in detail herein.

A "website" or "domain" may comprise one or more server computers configured to receive requests from one or more client computers, and respond by performing one or more operations or sending data to the one or more client computers. Each computer in the website may be communicatively coupled with one or more client computers or other computers over one or more computer networks.

A "website" doing or performing an operation may mean one or more computers of the website performing the operation. For example, a website receiving a request may mean one or more server computers in the website receiving the request. Sending data to a website may mean sending data to one or more computers in the website.

A "web page" may comprise one or more sets of instructions or data. For example, a web page may be comprise HTML, CSS, or JavaScript that includes data, or defines one or more operations, for a browser that receives the web page to parse or perform.

A "web page" doing or performing an operation may mean a client computer that is processing the web page, or a module processing the web page on the client computer, performing the operation. The web page may perform the operation in response to receiving one or more inputs from a user. For example, a web page sending a login request to a website may mean a browser processing a web page, receiving input from a user that includes a username and password, and in response, sending a request to login to an account on the website associated with the username.

1.0 General Overview

Websites want to protect their accounts, and accordingly, each account's credentials. To neutralize the risk of storing credentials that can be spilled, a website may use or store a hashed version of the underlying credential. A hash or hash value is a value that is produced by a function based on an original value. Hashes can be used in many different computer-related applications. For example, hashes can be used for encryption, to produce or validate credit card numbers, or to validate files. For example, a create-account page for a website may accept a unique username and password from a user, and send the username and password to the website. The website creates an account for the user, stores the username, and associates the username with the account. Instead of storing the password and associating the password to the username, the website may generate a hash of the password (referred herein to as a "hashed password"), store the hashed password, and associate the hashed password with the username.

To authenticate a user that visits the website, the website's login page may accept a username and password from the user and send the username and password to the website. The website hashes the password and compares the received username and newly hashed password to the stored username and stored hashed password. If the website determines that the received username and newly hashed password matches the stored username and stored hashed password, then the website gives the user access to the account associated with the received username; otherwise, the website denies access to the account associated with the received username.

1.3 Difficulty Detecting a Reused Spilled Credential

As discussed further herein, two hashes of the same credential can be different. For example, a user may reuse the same username and password for two different websites, but the websites may each generate and store a different hashed password because the websites each use a different salt. A salt may comprise one or more values and, as discussed further herein, can be used to generate a hash. Accordingly, if a hashed credential from a first website is spilled, then a second website may be unable to determine whether the spilled hashed credential matches any of the second website's hashed credentials.

1.4 Difficulty Determining that an Unpublished Credential is Spilled

Collecting published spilled credentials does not provide a mechanism to determine that an unpublished credential has been spilled. For example, if an attacker acquires a spilled credential, but does not publicly publish or sell the spilled credential, then the website may be unable to determine that the credential is spilled. To acquire more unpublished spilled credentials, a company may attempt to anonymously buy spilled credentials that are purported to be for that company's particular website's accounts. However, this solution would not provide information about other websites' spilled credentials that are reused in the particular website. A website may be unwilling to deal with the security, legal, and public-relation risks of buying other websites' spilled credentials.

1.5 Security Issues with Hashed Credentials

Attackers can use a brute force attack against a hashed credential, such as a hashed password associated with an account, to determine the original credential set by the account's authorized user. An attacker does not need access all the hashed passwords for all of a website's accounts to use a brute force attack against a hashed credential. Accordingly, if a website stores a subset of the hashed credentials on each storage device among a set of multiple storage devices and an attacker gets access to a single storage device in the set of storage devices, then the attacker can use a brute force attack against each hashed credential on the accessed storage device.

2.0 Protecting a Set of Credentials Using a Learned Set Model that Represents a Set of Credentials A model can represent a container, but the model need not include contents of the container. For example, a checksum can represent a file. A checksum can be generated based on the contents of a text file, but the checksum need not include any words in the text file. Similarly, a set model represents a set of two or more objects and can be trained based on the objects in the set of objects. A set model can also be used to test for membership of a particular object in the set of objects. However, just as a checksum need not include any words of a text file that the checksum represents, a set model need not include any of the objects in the set of objects.

Instead of storing a set of credentials or a set of hashed credentials, a computer or module can store a set model of the set of credentials or the set of hashed credentials. The computer or module can train the set model using the credentials in the set of credentials, or the hashed credentials in the set of hashed credentials. The computer or module may use the set model to determine whether a particular credential is a member of the set of credentials, or a particular hashed credential is in the set of hashed credentials. However, the set model need not include any of the credentials that are in the set of credentials, or the set of hashed credentials.

If a set model is trained using a set of objects, and if the set model does not include any of the objects in the set of objects, then an attacker cannot access the objects in the set of objects by merely having access to the set model. For example, if a set model is trained using a set of credentials, and if the set model does not include any of the credentials in the set of credentials, then an attacker cannot access the credentials in the set of credentials by merely having access to the set model. Also, for example, if a set model is trained using a set of hashed credentials, and if the set model does not include any of the hashed credentials in the set of hashed credentials, then an attacker cannot access the hashed credentials in the set of hashed credentials by merely having access to the set model.

A portion of a set model may be unusable. For example, a portion of a checksum may be unusable to determine whether a file was correctly downloaded. Similarly, if an attacker does not have access to the entire set model, then the one or more portions of the set model that the attacker has access to may be unusable. For example, if an attacker does not have access to the entire set model trained using a set of credentials or hashed credentials, then the one or more portions of the set model that the attacker has access to may be unusable. Accordingly, a first portion of a set model may be persistently stored on a different storage device than a second portion of the set model.

If a module that trains a set model, or tests for membership using the set model, is configured to do so using one or more proprietary values or algorithms, then an attacker that has access to the set model, but does not have access to the module, may be unable to the use the set model. Accordingly, at least a portion of the set model may be persistently stored on a different storage device than the one or more storage devices that are persistently storing the module. Examples of one or more proprietary values may be one or more salts discussed herein. Examples of one or more proprietary training algorithms are discussed herein.

2.1 Hashing Functions and Salts

Although a set model may represent a set of objects or a set of hashed objects, and the set model need not include any objects in the set of objects or any hashed object in the set of hashed objects, the module used to train the set model may use one or more hashing functions or salts to train the set model.

A function used to produce a hash may be referred to as a hashing function. A hashing function may produce a hash based on an input value and one or more operations or other values. For purposes of illustrating a clear example, assume a hashing function calculates an input value modulo 10, and the input numeral is 12345. The hash generated by the hashing function is five, which is 12345 modulo 10, or the remainder of 12345 divided by 10. A hashing function may be deterministic by producing the same hash based on the same input(s).

A hashing function may produce the same value for different inputs. Continuing with the previous example, the hashing function will also produce five as a hash for any input value that is five more than a multiple of 10, such as 5, 15, 25, 35, 45, and 55. Producing the same hash for two input values may be referred to herein as a collision.

A hash function may generate a hash based on an input value. A hash function may generate a hash based on or one or more values or parameters referred to herein as a salt. For purposes of illustrating a clear example, assume a hashing function takes an input value and a salt as parameters, the function calculates the sum of the input value and the salt, and the function generates a hash that is the sum modulo 10. Accordingly, if the input value is 12345 and the salt is two, then the hashing function will produce seven as the hash.

A hashing function may produce different hashes for the same input value if the hashing function uses different salts to generate each hash. Continuing with the previous example, if the input value is 12345 and the salt is three, then the hashing function will produce eight as the hash.

A hashing function can be used to produce hashes for non-numerical inputs. The hashing function may, but need not, produce a non-numerical hash. For example, a hashing function may take a string as input, such as "mypassword", and generate a hash that is the first three characters of the string, such as "myp". Also for example, a hashing function may take one or more bytes of data that represents a string, such as "mypassword", and generate a hash that is also one or more bytes, which when viewed as a string is "2f312joe2krjerkljw". A hashing function may produce a hash that is larger, smaller, or the same size as the input value.

Different hashing functions may have different properties. For example, a hashing function may be configured to produce hashes that are all the same length, regardless of the length of the input(s). A hashing function may be configured to produce hashes that are unlikely to produce collisions over one or more input domains, such as a set of possible passwords or salts. A hashing function may be configured to produce hashes over a small range resulting in intentional collisions. A hashing function may be configured to produce hashes over a range with a uniform distribution. A hashing function may be configured with one or more properties discussed herein or one or more other properties.

2.2 Example Set Models

There are many data structures that can be used as set models. For example, a bloom filter, count-min sketch, or other probabilistic data structure can be used as a set model that represents a set of learned credentials.

Some types of set models may provide additional data or less ambiguity. For example, a bloom filter is a probabilistic data structure that can be used to determine whether an object may be a member of a set of objects, or is not a member of the set of objects. A count-min sketch is a probabilistic data structure that can be used to determine whether a particular object has been learned, or the number of times or frequency that a particular object within a set of objects has been learned or observed.

A computer can generate a set model using one or more hashing functions. For example, a bloom filter may use a single hashing function, and a count-min sketch may use more than one hashing function.

2.2.1 Example of Learning a Credential by Training a Bloom Filter as a Set Model For purposes of illustrating a clear example of learning a credential by training a bloom filter, assume the following:

A computer has a bloom filter stored in memory;
The bloom filter comprises the following bit vector: <0,0,0,0, 0,0,0,0>;
The computer has a program or module that comprises a hashing function that produces a value between zero and 255 over a uniform distribution;
The module receives a first instruction to learn a first credential, and in response, generates 13 as the hash, which is represented with the following bit vector: <0,0,0,0, 1,1,0,1>;
The module receives a second instruction to learn a second credential, and in response, generates 66 as the hash, which is represented with the following bit vector: <0,1,0,0, 0,0,1,0>.

The module trains the bloom filter by performing one or more bit-wise OR operations with the bloom filter and the bit vectors generated based on the first credential and the second credential:

<0,0,0,0, 0,0,0,0>
<0,0,0,0, 1,1,0,1>
<0,1,0,0, 0,0,1,0>
<0,1,0,0, 1,1,1,1>

Each bit in a bit vector produced from a bit-wise OR is set to "1" if any bit in the same column, from the input bit vectors, is set to "1". Accordingly, after the module learns both the first credential and the second credential, the bloom filter comprises the following bit vector:
<0,1,0,0, 1,0,1,1>.

2.2.2 Example of Determining Whether the Set Model Represents a Set that Comprises a Candidate Credential A computer or module can determine whether the set model represents a set of credentials that includes a particular credential. Continuing with the previous example, assume the following:

The first learned credential and the second learned credential from the previous example are spilled credentials;

The module receives a first candidate credential to determine whether the first candidate credential is a learned spilled credential, and in response, generates 13 as the hash, which is represented with the following first candidate bit vector:
<0,0,0,0, 1,1,0,1>;

The module receives a second candidate credential to determine whether the second candidate credential is a learned spilled credential, and in response, generates 44 as the hash, which is represented with the following second candidate bit vector:
<0,0,1,0, 1,1,0,0>.

The module determines whether each bit set to "1" in the first candidate bit vector is also set in the bloom filter, which in this case is true. Accordingly, the module determines that the first candidate credential is in the set of credentials represented by the bloom filter, and therefore, the module determine that the first candidate credential may be a spilled credential.

The module determines whether each bit set to "1" in the second candidate bit vector is also set in the bloom filter, which in this case is false. Accordingly, the module determines that the second candidate credential is not in the set of credentials represented by the bloom filter, and therefore, the second candidate credential is not a spilled credential.

2.2.3 Portions of the Set Model May be Unusable

If an attacker acquires the module in the previous example, but only a portion of the bloom filter, then the module may be unable to determine whether a candidate password is in the set of credentials represented by the bloom filter. For purposes of illustrating a clear example, assume the following:

The attacker has the middle half of the bloom filter, believing that this middle half portion of the bloom filter is the entire bloom filter:
<0,0, 1,1>;

The attacker acquires the module used in the previous example;

The attacker performs a brute force attack by executing the module on a computer and providing the module with a list of candidate credentials;

The list of candidate credentials is a list of popular passwords, and includes the first candidate credential from the previous example;

The attacker may limit the module's output to four bits since the bloom filter was only four bits.

Eventually, the module generates a hash for the first candidate credential, which is 13 and produces the following bit vector:
<1,1,0,1>.

The module determines that the hash of the first candidate credential has two bits set to "1" that are not set to "1" in the middle half of the bloom filter. Accordingly, the module determines incorrectly that the first candidate credential is not in the set of credentials represented in the bloom filter that the website uses.

The module may also determine incorrectly that a password is in the set of credentials represented by the website's bloom filter. Continuing with the previous example, assume the following:

The module generates the following hash for a popular password in the list of popular passwords:
<0,0,0,1>;

The popular password is not the first credential, the second credential, or any other credential that the website's set model learned.

The module determines that each bit set to "1" in the hash of the popular password is also set to "1" in the middle half of the bloom filter. Accordingly, the module determines incorrectly that the bloom filter learned the popular password.

2.3 Reducing Ambiguity or Collisions in a Set Model

One or more set models or types of set models can create ambiguities or collisions: false positives or false negatives. For example, and continuing with the example in section 2.2.2, Example of Determining Whether the Set Model Represents a Set that Comprises a Candidate Credential, assume the module receives a third candidate credential, and in response, generates 12 as the hash, which is represented with the following third candidate bit vector:
<0,0,0,0, 1,1,0,0>.

Accordingly, the module may incorrectly determine that the third credential is a spilled credential, because the module determines that each bit set to "1" in the third candidate bit vector is also set to "1" in the bloom filter. A larger bloom filter can have fewer collisions than a smaller bloom filter.

2.3.1 Superset Models

A superset model can reduce ambiguities or collisions, such as false positives or false negatives. A superset model can comprise one or more data structures or set models to provide additional data or reduce ambiguity. However, because a superset model is also a type of set model, a superset model may be referred to as a set model.

A superset model may reduce false positives or false negatives by using data differently in each set model in the superset model, or using additional data. For purposes of illustrating a clear example, assume the following:

Each credential in a set of spilled credentials comprises a username and a password;

A computer has a superset model, with a first set model comprising a list of usernames and a second set model comprising a list of passwords stored in memory;

The computer has a program or module that can learn a credential by training the superset model;

For each credential in the set of spilled credentials, the module learns the credential by storing the username in the list of usernames and storing the password in the list of passwords.

In response to receiving a candidate credential that includes a candidate username and candidate password, the module may determine whether the list of usernames includes the candidate username and whether the list of passwords includes the candidate password. If so, then the module determines that the candidate credential is a spilled credential. However, if the list of usernames does not include the candidate username or the list of passwords does not include the candidate password, then the module may determine that the candidate credential is not spilled.

If an attacker is able to access this superset model, the attacker will not know which username is associated with which password. To further impede an attacker with access to the set model, the module may hash the passwords, and learn the hashed passwords rather than the original passwords. In response to receiving a candidate credential that includes a candidate username and candidate password, the module may hash the candidate password to produce a hashed candidate password. The module may determine whether the list of usernames includes the candidate username and whether the list of hashed passwords includes the hashed candidate password. If so, then the module determines that the candidate credential is a spilled credential. However, if the list of usernames does not include the candidate username or the list of hashed passwords does not include the hashed candidate password, then the module may determine that the candidate credential is not spilled.

In the example above, the module may have fewer false positives using the superset model than one or more other methods or models discussed herein, because the module will test for membership in both a set of usernames and a set of passwords rather than using only username. However, the module still produces some false positives. For example, the module may incorrectly determine that the candidate credential is spilled if both of the following are true:

The module learned the candidate username with a password that is different than the candidate password; and The module learned the candidate password with a username that is different than the candidate username.

2.3.2 Modifying Objects May Reduce Ambiguity

A module can modify one or more objects in a set of objects to reduce ambiguity. For purposes of illustrating a clear example, assume the following:

A computer has a program or module that can train a superset model to learn a set of spilled credentials comprising a username and a password;

The superset model comprises a first set model and a second set model;

The first set model comprises a database;

The database can store the usernames from the set of spilled credentials;

The database can store a set of salts;

The database can associate one or more salts with each username in the database;

The second set model comprises a bloom filter that can represent passwords from the set of spilled credentials.

For each credential in the set of credentials, the module may do the following:

Generate a salt based on the username in the credential;

Train the first set model by adding the username to the database;

Add the salt to the database and associate the salt with the username;

Generate a hash based on the password in the credential and the salt;

Train the bloom filter based on the hash.

A username may be associated with more than one salts. For example, if the set of spilled credentials includes a first credential and second credential, both of which include the same username, but different passwords. The salt can be one or more values comprising a pseudo-randomly generated value, or one or more characters of the username. Accordingly, the module may generate a first salt for the username that is different than the second salt.

As discussed herein, a salt may comprise one or more values. For example, a salt can comprise a pseudo-randomly generated value and an identifier for a website that is associated with the credential.

In this example, the module may be more accurate using the superset model than one or more other models discussed herein. Continuing with the current example, in response to receiving a request to determine whether a candidate credential is a member of the set of spilled credentials, the module may query the database in the first set model for the candidate username in the candidate credential. If the database does not return one or more salts to the module, then the module determines that the candidate credential is not a member of the set of spilled credentials. Otherwise, for each salt of the one or more salts returned by the database, the module may do the following:

Produce a hash based on the candidate password with the salt;

Test for membership of the hash in second set model as discussed herein;

If the module determines that a hash is a member of the set of hashed passwords represented by the second set model, then the module may determine that the candidate credential is a spilled credential;

If, for each salt of all of the one or more salts returned by the database, the module determines that the hash produced using the salt and the password is not a member of the set of hashed passwords represented by the second set model, then the module may determine that the candidate credential is not a spilled credential.

The foregoing example module and superset model may produce fewer false positives or false negatives than one or more other models discussed herein. For purposes of illustrating a clear example, and continuing with the previous example, assume the following:

The module is instructed to learn a first credential that has a first username and a first password;

The module generates a first salt;

The module generates a first hash based on the first salt and the first password;

The module trains the superset model as discussed herein based on the first username, the first salt, and the first hash;

The module does not train the superset model with another credential that includes the particular username;

The module does train the superset model as discussed herein with a second credential that includes a second username and a second password;

The first username is different than the second username;

The first password is different than the second password;

The module receives a candidate credential with a candidate username and a candidate password;

The candidate username matches the first username, but the candidate password is different than the first password;

The candidate username is different than the second username, and the candidate password matches the second password.

In response to receiving the candidate credential, the module tests for membership in the first set model using the candidate username. In response, the module may retrieve the first salt because the candidate username matches the first username, and the first username is associated with the first salt. The module may generate a candidate hash based on the candidate password and the first salt to produce a candidate hash. The module may test for membership of the candidate hash using the second set model. However, the candidate hash may be different than the first hash, because the module produced the first hash and the candidate hash using different passwords. The module may determine that the candidate hash is not a member of the set of hashes represented by the second set model. Accordingly, the module may correctly determine that the candidate credential is not a member of the superset model, and thus, the candidate credential is not a spilled credential.

2.3.3 Storing Superset Models

Each set model in a superset model can be stored separately. Continuing with the previous example, at least a portion of the database can be stored on a different storage device than the storage device(s) that store the list of passwords.

3.0 Network Topology for Detecting Spilled Credentials

FIG. 1 illustrates a computer system 100 for detecting spilled credentials in an example embodiment. The computer system 100 includes attack detection computer 110, client computer 120, client computer 122, website computer 130, and website computer 132 operably coupled over one or more computer networks.

For purposes of illustrating a clear example, in FIG. 1, one or more computers may be illustrated as separate computers operably coupled over one or more networks. However, one or more computers may be one or more of the same computers. For example, website computer 130 may comprise attack detection computer 110, or one or more computers or modules that attack detection computer 110 comprises.

3.1 Attack Detection Computer

Attack detection computer 110 comprises credential processing module 112, credential set model 114, and attack detection module 116. Attack detection computer 110, or one or more modules or computers that attack detection computer 110 comprises, may be operably coupled to client computer 120, client computer 122, website computer 130, and/or website computer 132. Attack detection computer 110 is illustrated a single computer, but may comprise one or more computers.

In FIG. 1, credential processing module 112, credential set model 114, and attack detection module 116 are illustrated as being executed or stored on the same one or more computers. However, at least a portion of credential processing module 112, credential set model 114, or attack detection module 116 may be executed or stored on one or more different computers.

3.1.1 Credential Processing Module

Credential processing module 112 may receive credentials from attack detection module 116, learn one or more of the credentials by training credential set model 114, or determine whether one or more credentials are members of a set of credentials represented by credential set model 114.

3.1.2 Credential Set Model

Credential set model 114 may be a set model comprising one or more set models or data structures discussed herein or other set model(s) or data structure(s). For example, credential set model 114 may be the superset model discussed in section 2.3.2, Modifying Objects May Reduce Ambiguity.

3.1.3 Attack Detection Module

Attack detection module 116 may receive requests from one or more client computers, such as client computer 120 or client computer 122. For example, attack detection module 116 may receive a request from client computer 120 that is intended for website computer 130. Also for example, and as discussed herein, client computer 120 may send a request to website computer 130, and website computer 130 may forward the request to attack detection module 116 for validation.

Attack detection module 116 may determine whether a request is part of an attack or from an attacker. There are many ways that attack detection module 116 may determine that a request is part of an attack. For example, attack detection module 116 may query credential processing module 112 to determine whether a particular credential in a request is a member of a set of spilled credentials. If credential processing module 112 determines, and returns a response to attack detection module 116 indicating, that the credential is a spilled credential, then attack detection module 116 may determine that the request is part of an attack. Also for example, attack detection module 116 may determine that a request is part of an attack if the request is one of several login requests, each of which includes a different credential, and are received from the same computer within a few seconds. Attack detection module 116 may determine whether a request is part of an attack based on one or more of the methods discussed herein or one or more other methods.

Attack detection module 116 may perform one or more negative actions in response to determining that a credential is spilled or that a request is part of an attack. For purposes of illustrating a clear example, assume the following:

Attack detection module 116 receives a request from client computer 120 intended for website computer 130;

The request includes a credential.

In response to determining that the credential is a spilled credential, or determining that the request is part of an attack, attack detection module 116 may send the credential in the request to credential processing module 112 to learn the credential, terminate the request, forward the request to the website computer 130 with one or more additional values indicating that the request is part of an attack or identifying an attack or security issue, or take one or more other negative actions.

Attack detection module 116 may perform one or more positive actions in response to determining that a request is not part of an attack or does not include one or more spilled credentials. For example, if attack detection module 116 determines that a request, from client computer 120 to website computer 130, is not part of an attack and does not include a spilled credential, then attack detection module 116 can forward the request to website computer 130 or perform one or more other positive actions. For example, attack detection module 116 may include data in the forwarded request indicating that the request is not part of attack.

3.2 Client Computers

Client computer 120 and client computer 122 may each be a computer that executes a browser or one or more other applications that may be communicatively coupled to attack detection computer 110, website computer 130, or website computer 132.

3.3 Website Computers

Website computer 130 and website computer 132 may each comprise one or more server computers operably coupled across one or more computer networks. Website computer 130 and website computer 132 may each receive requests for data from users through one or more computers, such as client computer 120, client computer 122, or attack detection computer 110. Website computer 130 and website computer 132 may each respond by sending data to the browser or client computer that sent the request. The data sent from either website computer 130 or website computer 132 may include instructions, such as HTML, JavaScript, and CSS instructions or code.

Figure 2:
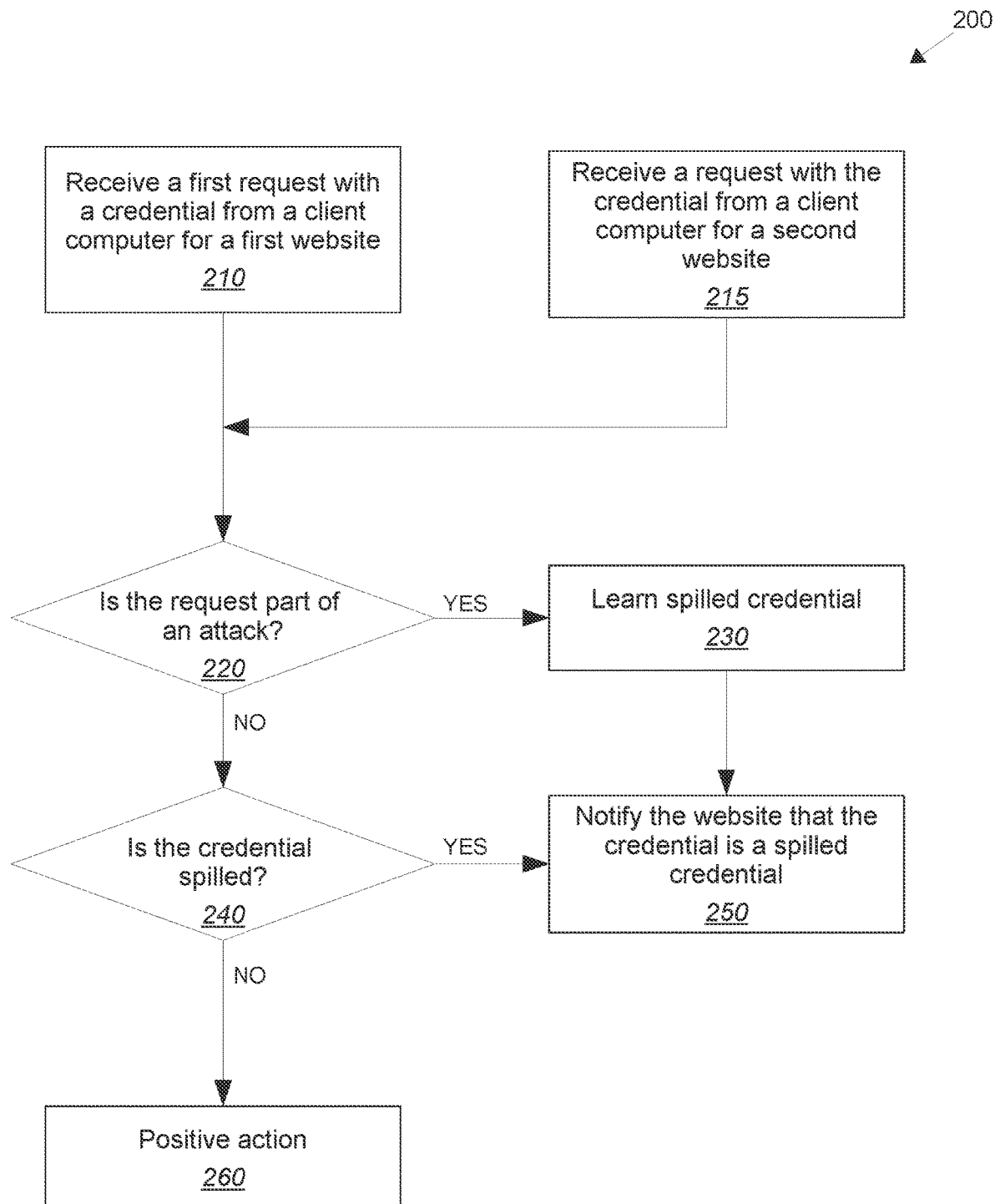
FIG. 2 illustrates a process for detecting one or more spilled credentials in one or more requests and performing one or more negative actions in an example embodiment.

4.0 Example Process for Detecting Spilled Credentials Using an Example Computer Network FIG. 2 illustrates a process 200 for detecting one or more spilled credentials in one or more requests and performing one or more negative actions in an example embodiment. In step 210, process 200 receives a first request with a credential for a client computer for a first website. For example, attack detection module 116 may receive a first request from client computer 120 for website computer 130 to login to an account.

4.1 Detecting that a Request with is Part of an Attack

In step 220, process 200 determines whether the first request is part of an attack. If so, then process 200 proceeds to step 230; otherwise, process 200 proceeds to step 240. For purposes of illustrating a clear example, assume attack detection module 116 determines that the first request is part of an attack. Accordingly, attack detection module 116 may proceed to step 230.

Attack detection module 116 may determine that the first request is part of an attack using one or more methods. For example, attack detection module 116 may determine that the first request is part of an attack based on a prior determination, such as client computer 120 appearing to use an Internet Protocol ("IP") address, or being within a sub-network, associated with one or more known attackers. Additionally or alternatively, attack detection module 116 may determine the first request is part of an attack based on one or more other factors, such as one or more factors discussed herein. For purposes of illustrating a clear example, assume that attack detection module 116 determines that the first request is part of an attack, and proceeds to step 230.

4.2 Learning a Spilled Credential

In step 230, process 200 learns the credential that was part of an attack as a spilled credential (e.g. adds the credential at issue to the set of spilled credential). For example, in response to determining that the first request is an attack, and if detection module 116 is configured to be optimistic, attack detection module 116 may send the first candidate credential to credential processing module 112 to learn or train credential set model 114. However, even though the request is determined to be part of an attack, the first candidate credential might not be a valid credential associated with an account on website computer 130. Training credential set model 114 with a credential that is not a valid credential can cause credential processing module 112 to produce false positives or false negatives.

If attack detection module 116 is configured to be pessimistic, then attack detection module 116 need not send the first candidate credential to credential processing module 112 to train credential set model 114. Attack detection module 116 may forward the first request to website computer 130 with one or more values indicating that the request is part of an attack. In response, website computer 130 may respond with data indicating whether or not the first candidate credential in the first request is a valid credential associated with an account on website computer 130. If not, then attack detection module 116 need not send the first candidate credential to credential processing module 112 to learn; otherwise, attack detection module 116 determines that the first candidate credential is a spilled credential, and sends the first candidate credential to credential processing module 112 to learn. Credential processing module 112 may train credential set model 114 to represent a set of spilled credentials that includes the first candidate credential. However, as discussed herein, credential set model 114 need not include the first candidate credential or any other credential represented in the set of spilled credentials.

4.3 Notifying a Website

In step 240, process 200 notifies the first website that the credential is spilled. For example, attack detection module 116 may send the first candidate credential to website computer 130, to a particular Application Programming Interface ("API") provided by website computer 130 or including one or more values indicating that the credential is spilled.

Attack detection module 116 may send one or more modified or unmodified values of the first candidate credential to website computer 130. For example, attack detection module 116 may encrypt the first candidate username in the first candidate credential using a public key provided to attack detection module 116 by website computer 130. Website computer 130 may have the corresponding private key, and can decrypt the first candidate username. Website computer 130 may take one or more actions to protect the account. For example, website computer 130 may update the account associated with the first candidate username to force the authorized account holder to reset the password associated with the first candidate username, or login using a second factor authentication method.

If attack detection module 116 is pessimistic, then attack detection module 116 may have already sent the credential to website computer 130. If so, attack detection module 116 need not send the first candidate credential or a portion of the credential to website computer 130.

4.4 Identifying a Spilled Credential that is not Publically Published

In step 215, process 200 receives a second request with the credential from a client computer for a second website. For example, process 200 may receive the second request at a time after the first request from step 210 is processed. For purposes of illustrating a clear example, assume the following:

The first request includes a first candidate credential comprising a first candidate username and a first candidate password;
Credential processing module 112, as discussed above, trained credential set model 114 using the first credential;
The second request includes a second candidate credential comprising a second candidate username and a second candidate password;
The second candidate username matches the first candidate username;
The second candidate password matches the first candidate password;

In step 220, process 200 determines whether the second request is part of an attack. For purposes of illustrating a clear example, assume the attack detection module 116 determines that the second request is not part of an attack. Accordingly, attack detection module 116 proceeds to step 240.

In step 240, process 200 determines whether the credential is a spilled credential (e.g. a credential that has been learned, that is, a credential in the set of spilled credentials). If so, process 200 proceeds to step 250; otherwise, process 200 proceeds to step 260. Continuing with the current example, attack detection module 116 may send the second candidate credential to credential to processing module 112. Credential processing module 112 tests the second candidate credential against credential set model 114. Since credential processing module 112 learned the first candidate credential, credential processing module 112 determines that the second candidate credential is a member of the set of spilled credentials represented by credential set model 114. Accordingly, attack detection module 116 proceeds to step 250.

In step 250, process 200 notifies the second website that the credential is spilled. For example, attack detection module 116 may notify website computer 132 that the second credential is a spilled credential using one or more methods discussed herein.

In the foregoing example, credential processing module 112 learned a spilled credential that was not publicly published or known to be spilled. Furthermore, attack detection module 116 detected the spilled credential and notified website computer 132 before an attacker used the spilled credentials against website computer 132. If client computer 122 was controlled by an attacker, then the attack detection module 116 or website computer 132 may prevent the attacker from getting access to the account associated with the spilled credential. If client computer 122 was controlled by an authorized user of the account associated with the spilled credential on website computer 132, then the attack detection module 116 or website computer 132 could reset the account password or require a second factor authentication so that the attacker using computer 120, or any other attacker, cannot use the spilled credentials to get unauthorized access to the account associated with the spilled credentials on website computer 132.

In step 260, process 200 performs a positive action. For example, if attack detection module 116 receives a third request with a third candidate credential for website computer 130, and if attack detection module 116 determines the third request is not an attack or part of an attack, and the third candidate credential is not a spilled credential, then attack detection module 116 may forward the third request to website computer 130.

5.0 Out-of-Band Topology and Process

In FIG. 1, attack detection computer 110 is inline and physically or logically positioned between one or more client computers and one or more server computers. In an embodiment, attack detection computer 110, or one or more computers or modules in attack detection computer 110, may be out-of-band. In an out-of-band network topology, a client computer can send a request to a website computer. The website computer can forward the request, one or more values in the request, or one or more other values to attack detection computer 110. Attack detection computer 110 can determine whether the request is part of an attack or includes one or more spilled credentials, send a response to the website computer indicating whether the request is part of an attack or whether the request includes a spilled credential, or perform one or more positive or negative actions.

For purposes of illustrating a clear example, assume the following:

Client computer 120 sends a request with a credential to website computer 130;

Website computer 130 forwards the request to attack detection module 116.

Attack detection module 116 determines whether the request is part of an attack.

In response to determining that the request is not part of an attack or the credential is not a spilled credential, attack detection module 116 may perform one or more positive actions. For example, attack detection module 116 may send data to website computer 130 indicating that the request is not part of an attack or the credential is not a spilled credential.

In response to determining that the request is part of an attack, attack detection module 116 may perform one or more negative actions. For example, attack detection module 116 may send the credential to credential processing module 112 to learn the credential. Attack detection module 116 may send data to website computer 130 indicating that the request is part of an attack, the credential is a spilled credential, or the request is part of one or more types of attacks.

In the previous example, if attack detection module 116 determines that the request is part of an attack, but the credential is not a learned spilled credential, then attack detection module 116 may send data to website computer 130 indicating that the request is part of an attack, but is not a learned spilled credential. In response, website computer 130 may determine whether the credential is a valid credential associated with an account. If so, website computer 130 may send a request to attack detection module 116 with the credential indicating that the credential is associated with a valid credential. In response, attack detection module 116 may send the credential to credential processing module 112 to learn or perform one or more other negative actions.

Additionally or alternatively, website computer 130 may send a request to attack detection module 116 that includes a credential and data that indicates the credential is a valid credential for an account on website computer 130. In response, if attack detection module 116 determines that the request is part of an attack, then attack detection module 116 may send the credential to credential processing module 112. Credential processing module 112 may learn the credential by training credential set model 144 using the credential. Attack detection module 116 may send a response to website computer 130 indicating that the request is an attack or that the credential is a spilled credential.

6.0 Implementation Mechanisms-Hardware Over View

According to one embodiment, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field programmable gate arrays (FPGAs) that are persistently programmed to perform the techniques. Alternatively and/or in addition, the one or more special-purpose computing devices may include one or more general purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices and/or any other device that incorporates hard-wired or program logic to implement the techniques.

Figure 3:
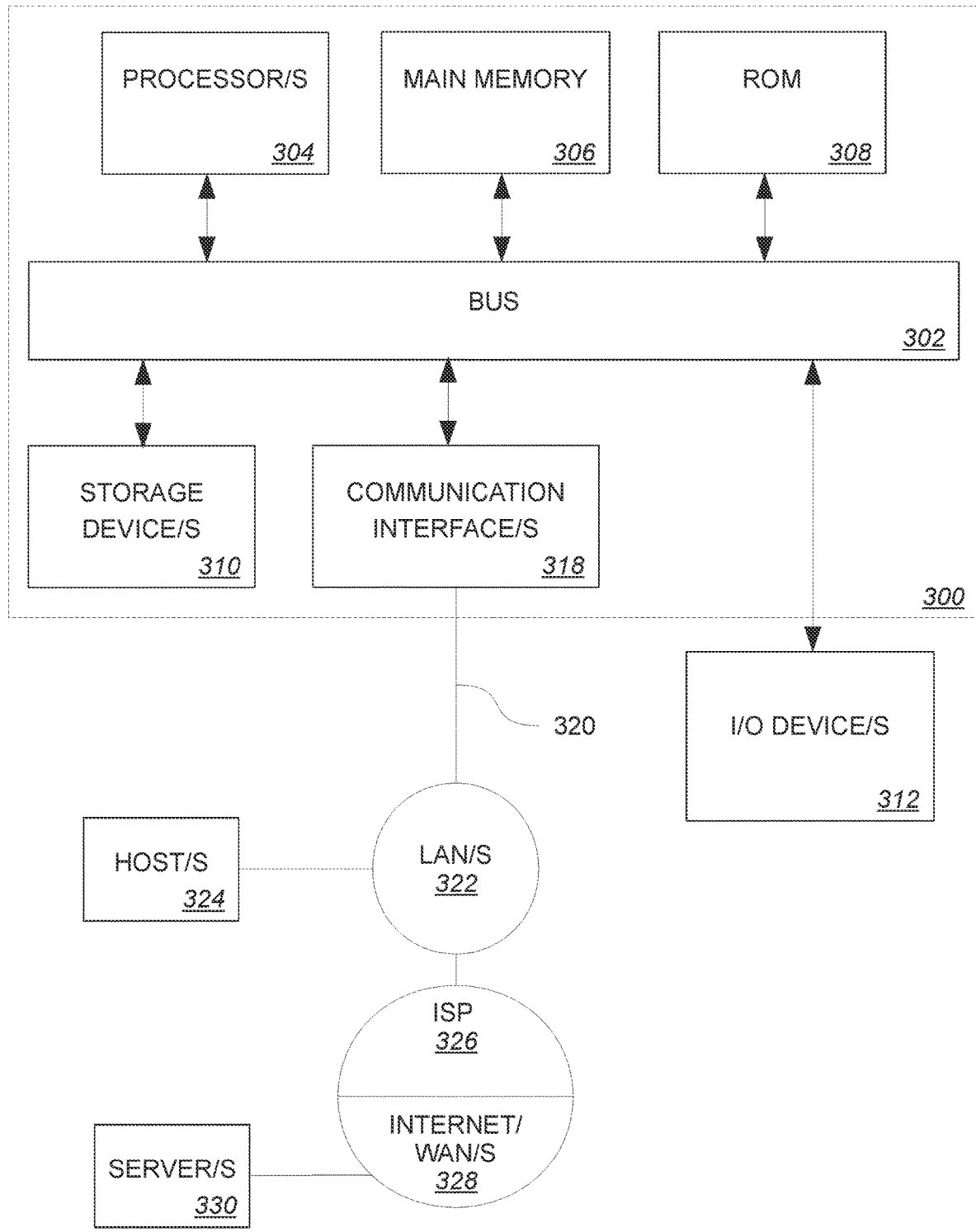
FIG. 3 illustrates a computer system upon which an embodiment may be implemented.

For example, FIG. 3 is a block diagram that illustrates a computer system 300 upon which an embodiment of the invention may be implemented. Computer system 300 includes a bus 302 or other communication mechanism for communicating information, and one or more hardware processors 304 coupled with bus 302 for processing information, such as basic computer instructions and data. Hardware processor/s 304 may include, for example, one or more general-purpose microprocessors, graphical processing units (GPUs), coprocessors, central processing units (CPUs), and/or other hardware processing units.

Computer system 300 also includes one or more units of main memory 306 coupled to bus 302, such as random access memory (RAM) or other dynamic storage, for storing information and instructions to be executed by processor/s 304. Main memory 306 may also be used for storing temporary variables or other intermediate information during execution of instructions to be executed by processor/s 304. Such instructions, when stored in non-transitory storage media accessible to processor/s 304, turn computer system 300 into a special-purpose machine that is customized to perform the operations specified in the instructions. In some embodiments, main memory 306 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

Computer system 300 may further include one or more units of read-only memory (ROM) 308 or other static storage coupled to bus 302 for storing information and instructions for processor/s 304 that are either always static or static in normal operation but reprogrammable. For example, ROM 308 may store firmware for computer system 300. ROM 308 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 310, such as a magnetic disk or optical disk, is provided and coupled to bus 302 for storing information and/or instructions. Storage device/s 310 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid state drives, flash memory, optical disks, one or more forms of non-volatile random access-memory (NVRAM), and/or other non-volatile storage media.

Computer system 300 may be coupled via bus 302 to one or more input/output (I/O) devices 312. For example, I/O device/s 312 may include one or more displays for displaying information to a computer user, such as a cathode ray tube (CRT) display, a Liquid Crystal Display (LCD) display, a Light-Emitting Diode (LED) display, a projector, and/or any other type of display.

I/O device/s 312 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selections to processor 304 and for controlling cursor movement on another I/O device (e.g. a display). This input device typically has at degrees of freedom in two or more axes, (e.g. a first axis x, a second axis y, and optionally one or more additional axes z . . . ), that allows the device to specify positions in a plane. In some embodiments, the one or more I/O device/s 312 may include a device with combined I/O functionality, such as a touch-enabled display.

Other I/O device/s 312 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with processor/s 304 over bus 302.

Computer system 300 may implement the techniques described herein using customized hard-wired logic, one or more ASICs or FPGAs, firmware or program logic which, in combination with the computer system causes or programs, causes computer system 300 to be a special-purpose machine. According to one embodiment, the techniques herein are performed by computer system 300 in response to processor/s 304 executing one or more sequences of one or more instructions contained in main memory 306. Such instructions may be read into main memory 306 from another storage medium, such as one or more storage device/s 310. Execution of the sequences of instructions contained in main memory 306 causes processor/s 304 to perform the process steps described herein. In alternative embodiments, hard-wired circuitry may be used in place of or in combination with software instructions.

Computer system 300 also includes one or more communication interfaces 318 coupled to bus 302. Communication interface/s 318 provide two-way data communication over one or more physical or wireless network links 320 that are connected to a local network 322 and/or a wide area network (WAN), such as the Internet. For example, communication interface/s 318 may include an integrated services digital network (ISDN) card, cable modem, satellite modem, or a modem to provide a data communication connection to a corresponding type of telephone line. Alternatively and/or in addition, communication interface/s 318 may include one or more of: a local area network (LAN) device that provides a data communication connection to a compatible local network 322; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network access a wide area network (WAN, such as the Internet 328); and other networking devices that establish a communication channel between computer system 300 and one or more LANs 322 and/or WANs.

Network link/s 320 typically provides data communication through one or more networks to other data devices. For example, network link/s 320 may provide a connection through one or more local area networks 322 (LANs) to one or more host computers 324 or to data equipment operated by an Internet Service Provider (ISP) 326. ISP 326 in turn provides connectivity to one or more wide area networks 328, such as the Internet. LAN/s 322 and WAN/s 328 both use electrical, electromagnetic or optical signals that carry digital data streams. The signals through the various networks and the signals on network link/s 320 and through communication interface/s 318 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its main memory 306 and send the instructions over a telecommunications line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 can send messages and receive data, including program code, through the network(s), network link 320 and communication interface 318. In the Internet example, one or more servers 330 might transmit signals corresponding to data or instructions requested for an application program executed by the computer system 300 through the Internet 328, ISP 326, local network 322 and a communication interface 318. The received signals may include instructions and/or information for execution and/or processing by processor/s 304. Processor/s 304 may execute and/or process the instructions and/or information upon receiving the signals by accessing main memory 306, or at a later time by storing them and then accessing them from storage device/s 310.

7.0 Other Aspects of Disclosure

[1] Using the networked computer arrangements, intermediary computer, or processing methods described herein, security in client-server data processing may be significantly increased. Polymorphic techniques discussed herein effectively reduce automated attacks. Consequently, one or more various attacks, such as a denial of service ("DOS") attack, credential stuffing, fake account creation, ratings or results manipulation, man-in-the-browser attacks, reserving rival goods or services, scanning for vulnerabilities, or exploitation of vulnerabilities, are frustrated because object identifiers or polymorphic hooks may change over time.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A security computing device, comprising memory comprising programmed instructions stored thereon and one or more processors configured to be capable of executing the stored programmed instructions to:
   train a set model based on a first set of spilled credentials, wherein the trained set model is a probabilistic data structure representing the first set of spilled credentials without comprising any credential of the first set of spilled credentials;
   receive from a client a first request with the first candidate credential to login to a server;
   determine, with the trained set model, whether the first candidate credential is a member of the first set of spilled credentials; and
   perform a negative action in response to the first candidate credential being determined as a member of the first set of spilled credentials.

2. The device of claim 1, wherein for the perform the negative action, the processors are further configured to be capable of executing the stored programmed instructions to:
   terminate the first request without forwarding the first request to the server.

3. The device of claim 1, wherein for the perform the negative action, the processors are further configured to be capable of executing the stored programmed instructions to:
   forward the first request to a website computer with at least one value indicating that the first request is an attack.

4. The device of claim 1, wherein for the perform the negative action, the processors are further configured to be capable of executing the stored programmed instructions to:
   forward the first request to a website computer with at least one value indicating that the first candidate credential in the first request is a spilled credential.

5. A method implemented by a network security system comprising one or more security computing devices, server devices, or client devices, the method comprising:
   training a set model based on a first set of spilled credentials, wherein the trained set model is a probabilistic data structure representing the first set of spilled credentials without comprising any credential of the first set of spilled credentials;
   receiving from a client a first request with the first candidate credential to login to a server;
   determining, with the trained set model, whether the first candidate credential is a member of the first set of spilled credentials; and
   performing a negative action in response to the first candidate credential being determined as a member of the first set of spilled credentials.

6. The method of claim 5, wherein the performing the negative action further comprises:
   terminating the first request without forwarding the first request to the server.

7. The method of claim 5, wherein the performing the negative action further comprises:
   forwarding the first request to a website computer with at least one value indicating that the first request is an attack.

8. The method of claim 5, wherein the performing the negative action further comprises:
   forwarding the first request to a website computer with at least one value indicating that the first candidate credential in the first request is a spilled credential.

9. A non-transitory computer readable medium having stored thereon instructions comprising executable code that, when executed by one or more processors, causes the processors to:
   train a set model based on a first set of spilled credentials, wherein the trained set model is a probabilistic data structure representing the first set of spilled credentials without comprising any credential of the first set of spilled credentials;

receive from a client a first request with the first candidate credential to login to a server;

determine, with the trained set model, whether the first candidate credential is a member of the first set of spilled credentials; and perform a negative action in response to the first candidate credential being determined as a member of the first set of spilled credentials.

10. The non-transitory computer readable medium of claim 9, wherein for the perform the negative action, the executable code, when executed by the processors, further causes the processors to:

terminate the first request without forwarding the first request to the server.

11. The non-transitory computer readable medium of claim 9, wherein for the perform the negative action, the executable code, when executed by the processors, further causes the processors to:

forward the first request to a website computer with at least one value indicating that the first request is an attack.

12. The non-transitory computer readable medium of claim 9, wherein for the perform the negative action, the executable code, when executed by the processors, further causes the processors to:

forward the first request to a website computer with at least one value indicating that the first candidate credential in the first request is a spilled credential.

13. A network security system, comprising one or more security computing devices, server devices, or client devices with memory comprising programmed instructions stored thereon and one or more processors configured to be capable of executing the stored programmed instructions to:

train a set model based on a first set of spilled credentials, wherein the trained set model is a probabilistic data structure representing the first set of spilled credentials without comprising any credential of the first set of spilled credentials;

receive from a client a first request with the first candidate credential to login to a server;

determine, with the trained set model, whether the first candidate credential is a member of the first set of spilled credentials; and perform a negative action in response to the first candidate credential being determined as a member of the first set of spilled credentials.

14. The system of claim 13, wherein for the perform the negative action, the processors are further configured to be capable of executing the stored programmed instructions to:

terminate the first request without forwarding the first request to the server.

15. The system of claim 13, wherein for the perform the negative action, the processors are further configured to be capable of executing the stored programmed instructions to:

forward the first request to a website computer with at least one value indicating that the first request is an attack.

16. The system of claim 13, wherein for the perform the negative action, the processors are further configured to be capable of executing the stored programmed instructions to:

forward the first request to a website computer with at least one value indicating that the first candidate credential in the first request is a spilled credential.

\* \* \* \* \*